US012801105B2

(12) United States Patent
Tashiro et al.

(10) Patent No.: US 12,801,105 B2
(45) Date of Patent: Nov. 17, 2026

(54) INFORMATION PROCESSING APPARATUS AND RECORDING MEDIUM

(71) Applicant: Mitsubishi Electric Corporation, Tokyo (JP)

(72) Inventors: Hideaki Tashiro, Tokyo (JP); Hidematsu Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 372 days.

(21) Appl. No.: 18/707,898

(22) PCT Filed: Feb. 21, 2022

(86) PCT No.: PCT/JP2022/006885
§ 371 (c)(1),
(2) Date: May 7, 2024

(87) PCT Pub. No.: WO2023/157284
PCT Pub. Date: Aug. 24, 2023

(65) Prior Publication Data
US 2026/0244174 A1 Aug. 20, 2026

(51) Int. Cl.
*G05B 15/02* (2006.01)

(52) U.S. Cl.
CPC .................................... *G05B 15/02* (2013.01)

(58) Field of Classification Search
CPC ............ G05B 15/02; G06F 9/455; G06F 9/50
See application file for complete search history.

(56) References Cited

U.S. PATENT DOCUMENTS

| | | | | |
|---|---|---|---|---|
| 10,216,169 | B2 * | 2/2019 | Ogawa | G05B 19/19 |
| 10,795,364 | B1 * | 10/2020 | Abeloe | B60R 11/0217 |
| 2001/0044007 | A1 | 11/2001 | Valyi et al. | |
| 2014/0336786 | A1 * | 11/2014 | Asenjo | G06F 3/048 700/17 |

(Continued)

FOREIGN PATENT DOCUMENTS

| | | | |
|---|---|---|---|
| JP | 2000-099478 | A | 4/2000 |
| JP | 2001-306535 | A | 11/2001 |

(Continued)

OTHER PUBLICATIONS

Office Action dated Aug. 28, 2025, issued for the corresponding IN patent application No. 202427045458, 9pp.

(Continued)

*Primary Examiner* — Dong U Kim
(74) *Attorney, Agent, or Firm* — XSENSUS LLP

(57) ABSTRACT

An information processing apparatus is connectable through a network to a facility in which a machine is controlled. The information processing apparatus includes a base that receives data about control of the machine through the network and provides the data, a plurality of individual applications that output, to the network, results acquired by performing different processes on the data provided by the base, and integration application that selects two or more individual applications of the plurality of individual applications in accordance with a predetermined condition, and outputs, to the network, integration information acquired by integrating results of processes performed by the selected two or more individual applications.

9 Claims, 10 Drawing Sheets

(56) References Cited

U.S. PATENT DOCUMENTS

| | | | |
|---|---|---|---|
| 2016/0124742 | A1 | 5/2016 | Rangasamy et al. |
| 2019/0087176 | A1 | 3/2019 | Krishnappa et al. |
| 2021/0108351 | A1 | 4/2021 | Patterson et al. |

FOREIGN PATENT DOCUMENTS

| | | | |
|---|---|---|---|
| JP | 2007-304681 | A | 11/2007 |
| JP | 2012146183 | A | 8/2012 |
| JP | 2020-534587 | A | 11/2020 |
| WO | 2023157284 | A1 | 8/2023 |

OTHER PUBLICATIONS

German Office Action dated Feb. 27, 2025, issued for the corresponding DE Patent Application No. 112022005229.5 and the English translation, 34pp.

Office Action (Hearing Notice) dated May 8, 2026, issued for the corresponding IN patent application No. 202427045458, 10pp.

International Search Report and Written Opinion mailed on May 10, 2022, received for PCT Application PCT/JP2022/006885, filed on Feb. 21, 2022, 9 pages including English Translation.

Notice of Reason for Refusal mailed on Oct. 4, 2022, received for JP Application 2022-541773, 6 pages including English Translation.

Decision to Grant mailed on Nov. 29, 2022, received for JP Application 2022-541773, 5 pages including English Translation.

* cited by examiner

FIG.5

| MANAGEMENT INFORMATION | | | | |
|---|---|---|---|---|
| DATA TYPE | To | Via | Via | From |
| AA DATA | INTEGRATION APPLICATION [ 13 ] | INDIVIDUAL APPLICATION [ 12b ] | DEVICE [ D1 ] | — |
| BB DATA | INTEGRATION APPLICATION [ 13 ] | INDIVIDUAL APPLICATION [ 12c ] | DEVICE [ D2 ] | DEVICE [ D6 ] |
| AA DATA | INTEGRATION APPLICATION [ 13 ] | INDIVIDUAL APPLICATION [ 12d ] | DEVICE [ D3 ] | DEVICE [ D5 ] |
| BB DATA | INTEGRATION APPLICATION [ 13 ] | INDIVIDUAL APPLICATION [ 12e ] | DEVICE [ D4 ] | — |

INFORMATION PROCESSING APPARATUS AND RECORDING MEDIUM

CROSS-REFERENCE TO RELATED APPLICATION

This application is a national stage application, pursuant to 35 U.S.C. § 371, of International Patent Application No. PCT/JP2022/006885, filed Feb. 21, 2022, the entire contents of which are incorporated herein by reference.

TECHNICAL FIELD

The present disclosure relates to an information processing apparatus, a data processing method, and a program.

BACKGROUND ART

Multiple cloud manufacturers provide cloud infrastructures such as infrastructure as a service (IaaS) and platform as a service (PaaS). A corporate user builds a specific system on such a cloud infrastructure provided by a cloud manufacturer to provide specific cloud services to customers. The use of such cloud services has received attention in the field of factory automation (FA).

To build a system for providing the cloud services described above, various applications may be installed on the cloud infrastructure to respond to various requests from the customers (see, for example, Patent Literature 1). Patent Literature 1 describes a technique for accessing a central server and applying, when a new update is available for an application stack in the cloud environment, the new update to the application environment.

Citation List

Patent Literature

Patent Literature 1: Unexamined Japanese Patent Application Publication (Translation of PCT Application) No. 2020-534587

SUMMARY OF INVENTION

Technical Problem

At an FA site, machines are typically controlled to perform various processes such as processes on a production line. An application using information about control of such machines can be executed on a cloud infrastructure to provide various useful cloud services to customers at the site.

However, the application on the cloud infrastructure is developed based on an application programming interface (API) of the cloud infrastructure by a corporate user that is different from the cloud manufacturer providing the cloud infrastructure and is thus likely to increase the development processes. Additionally, developing various applications to respond to customer requests may involve application processes that overlap one another. The development processes of such applications can be redundant. A single application that integrates multiple applications including overlapping processes may reduce cloud resources but involves complicated development. The workload is thus to be reduced for developing an application executable in a cloud environment for use at an FA site.

Under such circumstances, an objective of the present disclosure is to reduce the workload of developing an application executable in a cloud environment for use at an FA site.

Solution to Problem

To achieve the above objective, an information processing apparatus according to the present disclosure is connectable through a network to a facility in which a machine is controlled. The information processing apparatus includes providing means for receiving data about control of the machine through the network and providing the data, a plurality of individual processing means for outputting, to the network, results acquired by performing different processes on the data provided by the providing means, and integration means for selecting two or more individual processing means of the plurality of individual processing means in accordance with a predetermined condition, and outputting, to the network, integration information acquired by integrating results of processes performed by the selected two or more individual processing means.

Advantageous Effects of Invention

In the structure according to the present disclosure, the integration means outputs, to the network, integration information acquired by integrating the results of the processes performed by the selected individual processing means. The application for implementing the integration means and the application for implementing the individual processing means are both likely to be developed by a corporate user, and thus the integration means can be developed independently of an API of a cloud infrastructure. The integration means reuses the results of the processes performed by the individual processing means and thus reduces resources for developing the individual processing means and the integration means. This can reduce the workload of developing an application executable in a cloud environment for use at an FA site.

BRIEF DESCRIPTION OF DRAWINGS

FIG. 5 is a table of example management information in Embodiment 1;

DESCRIPTION OF EMBODIMENTS

An information processing apparatus according to one or more embodiments of the present disclosure is described in detail below with reference to the drawings. The information processing apparatus is a server device provided by a cloud manufacturer and including a basic service infrastructure available to a user. The user develops applications executable on this service infrastructure and executes the applications on the information processing apparatus to provide various cloud services to customers. Additionally, the information processing apparatus selects an application that satisfies a specific condition from multiple applications and executes an upper application that integrates the results of the processes performed by selected applications.

Embodiment 1

Figure 1:
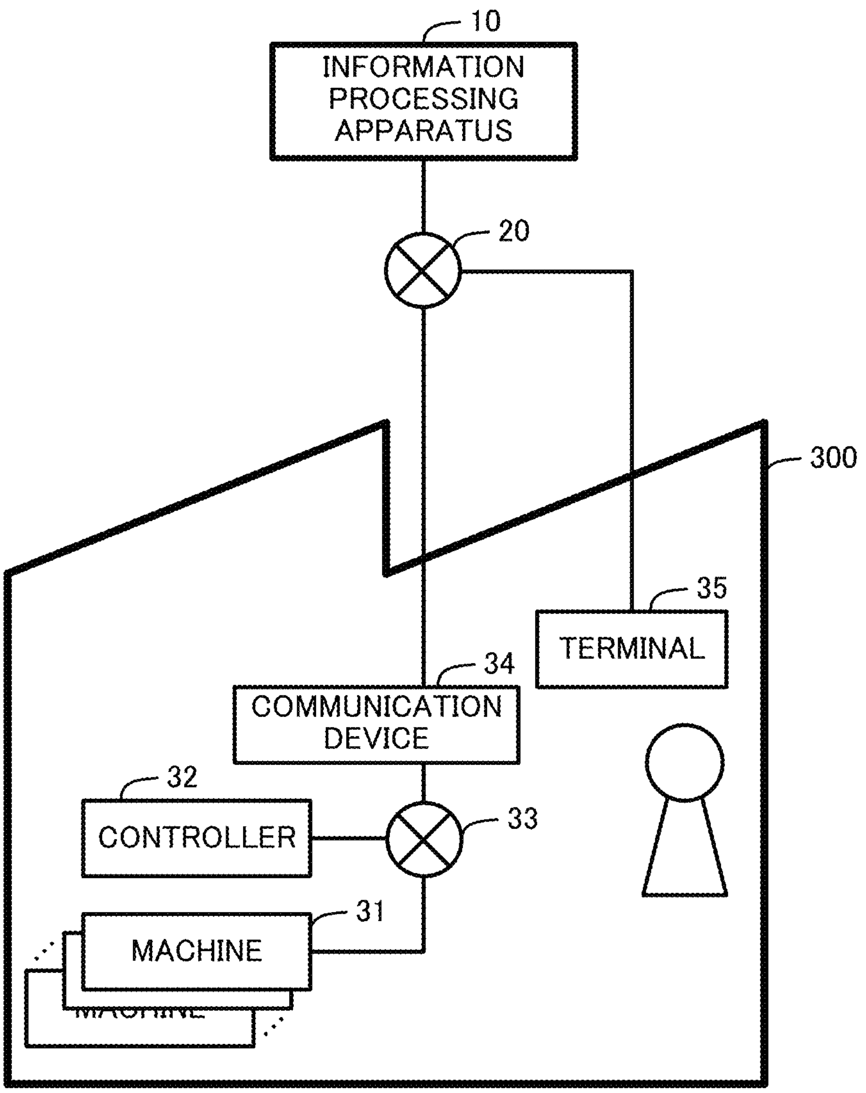
FIG. 1 is a diagram of a facility and an information processing apparatus according to Embodiment 1.

An information processing apparatus 10 according to the present embodiment is a server device on a network that provides, to an external device, processing results of data acquired from an external device. More specifically, as illustrated in FIG. 1, the information processing apparatus 10 is connectable through a network 20 to a facility 300 in which machines 31 are controlled. The network 20 may be a wide area network such as the Internet, or a virtual network or a dedicated network such as a virtual private network (VPN).

The facility 300 is a factory or a plant. The facility 300 may be any building in which the machines 31 are controlled. For example, the facility 300 may be a farm on which the machines 31 as agricultural robots are controlled.

In the facility 300, the multiple machines 31 are controlled by a controller 32 through an industrial network 33. Each machine 31 is, for example, a sensor for detecting workpieces transported by a conveyor belt, a machining tool for machining the workpieces, an inspector for determining the quality of the workpieces, a robot for removing defective workpieces from a line, or another FA machine.

The controller 32 is, for example, a programmable logic controller (PLC) that controls the machines 31 and interrelates the operations of the machines 31 to operate a production line, a machining line, an inspection line, and other processing lines. FIG. 1 illustrates one controller 32 as a typical example. However, multiple controllers 32 may control the machines 31 in the facility 300. For example, a first controller 32 may acquire sensing results from a machine 31 being a sensor, and a second controller 32 sharing the sensing results with the first controller 32 may transmit a control instruction to a machine 31 being a robot.

A communication device 34 as a gateway is located between the industrial network 33 and the network 20. The information processing apparatus 10 acquires data about the control of the machines 31 from at least one of the machines 31 or the controller 32 through the communication device 34. Data about the control of the machines 31 may be, for example, the sensing results from the machine 31 being the sensor, the control instruction to the machines 31 from the controller 32, the state of a control program executed by the controller 32, device values stored in a memory of the controller 32 being a programmable logic controller (PLC), or other information. Data about the control of the machines 31 may be hereafter referred to as control data.

The information processing apparatus 10 provides, in response to a request from a terminal 35 connected to the network 20, processing results of the control data to the terminal 35. The information provided from the information processing apparatus 10 to the terminal 35 may be, for example, the operation states of the multiple machines 31, the operation rate of the production line, or other information. The terminal 35 corresponds to a user interface (UI) device for a customer who uses the applications prepared by the user.

Figure 2:
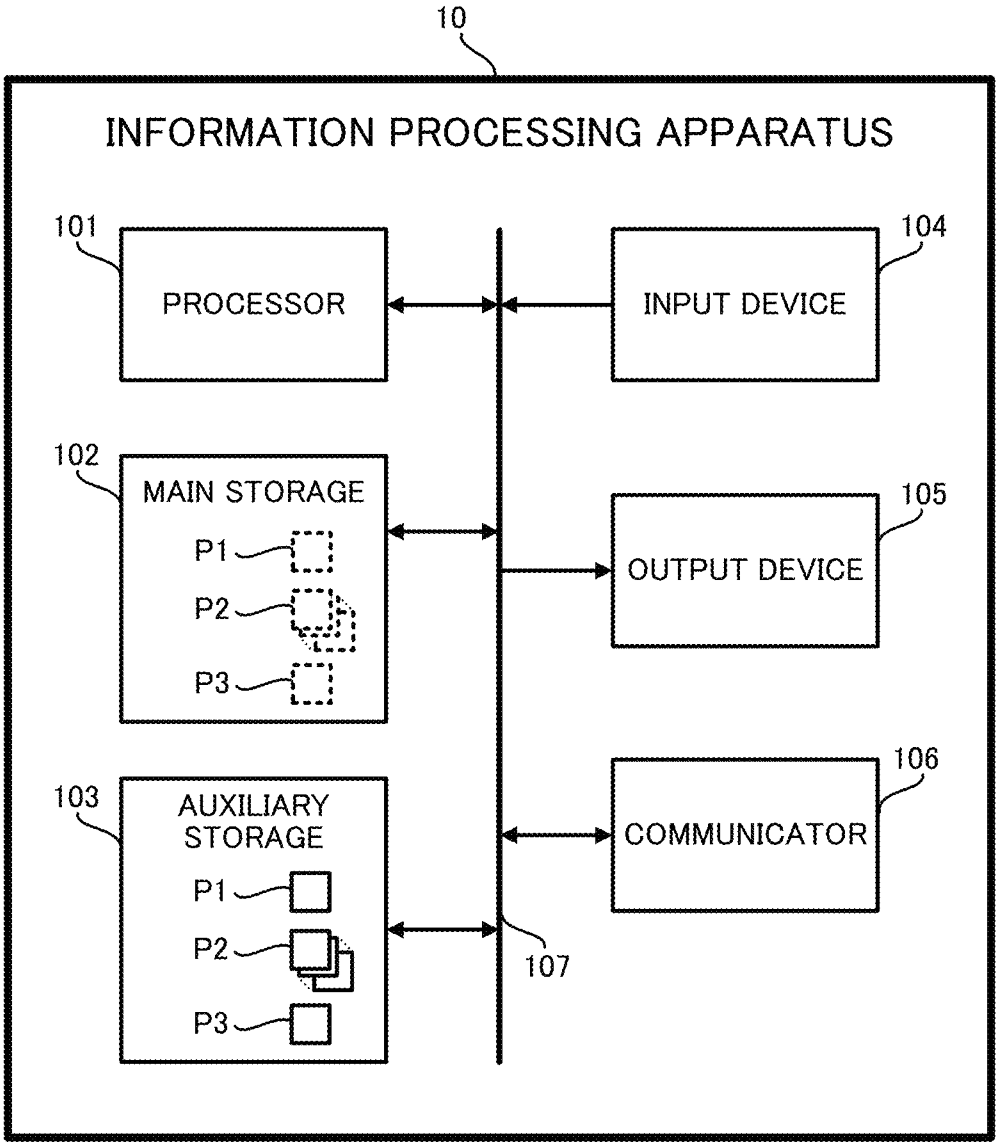
FIG. 2 is a diagram of the information processing apparatus according to Embodiment 1, illustrating the hardware configuration.

FIG. 2 is a schematic block diagram of the information processing apparatus 10, illustrating the hardware configuration. As illustrated in FIG. 2, the information processing apparatus 10 is a computer including a processor 101, a main storage 102, an auxiliary storage 103, an input device 104, an output device 105, and a communicator 106. The main storage 102, the auxiliary storage 103, the input device 104, the output device 105, and the communicator 106 are connected to the processor 101 with an internal bus 107.

The processor 101 includes a processing circuit such as a central processing unit (CPU). The processor 101 executes programs P1, P2, and P3 stored in the auxiliary storage 103 to implement various functions to perform the processing described later.

The main storage 102 includes a random-access memory (RAM). The programs P1, P2, and P3 are loaded into the main storage 102 from the auxiliary storage 103. The main storage 102 is used as a work area for the processor 101.

The auxiliary storage 103 includes a nonvolatile memory such as an electrically erasable programmable read-only memory (EEPROM) or a hard disk drive (HDD). The auxiliary storage 103 stores the program P1 prepared by the cloud manufacturer and the programs P2 and P3 prepared by the user. The auxiliary storage 103 also stores various pieces of data used for processing performed by the processor 101. The auxiliary storage 103 provides data to be used by the processor 101 to the processor 101 as instructed by the processor 101. The auxiliary storage 103 stores the data provided from the processor 101.

The input device 104 includes, for example, a hardware switch, an input key, a keyboard, or a pointing device. The input device 104 acquires information input by a manager of the information processing apparatus 10 and provides the acquired information to the processor 101.

The output device 105 includes, for example, a display device such as a light-emitting diode (LED) or a liquid crystal display (LCD), and an acoustic device such as a buzzer or a speaker. The output device 105 provides various types of information to the user or the customer as instructed by the processor 101.

The communicator 106 includes an interface circuit for communicating with external devices. The communicator 106 receives signals through the network 20 and outputs data carried by these signals to the processor 101. The communicator 106 also transmits signals carrying data output from the processor 101 to the network 20.

Figure 3:
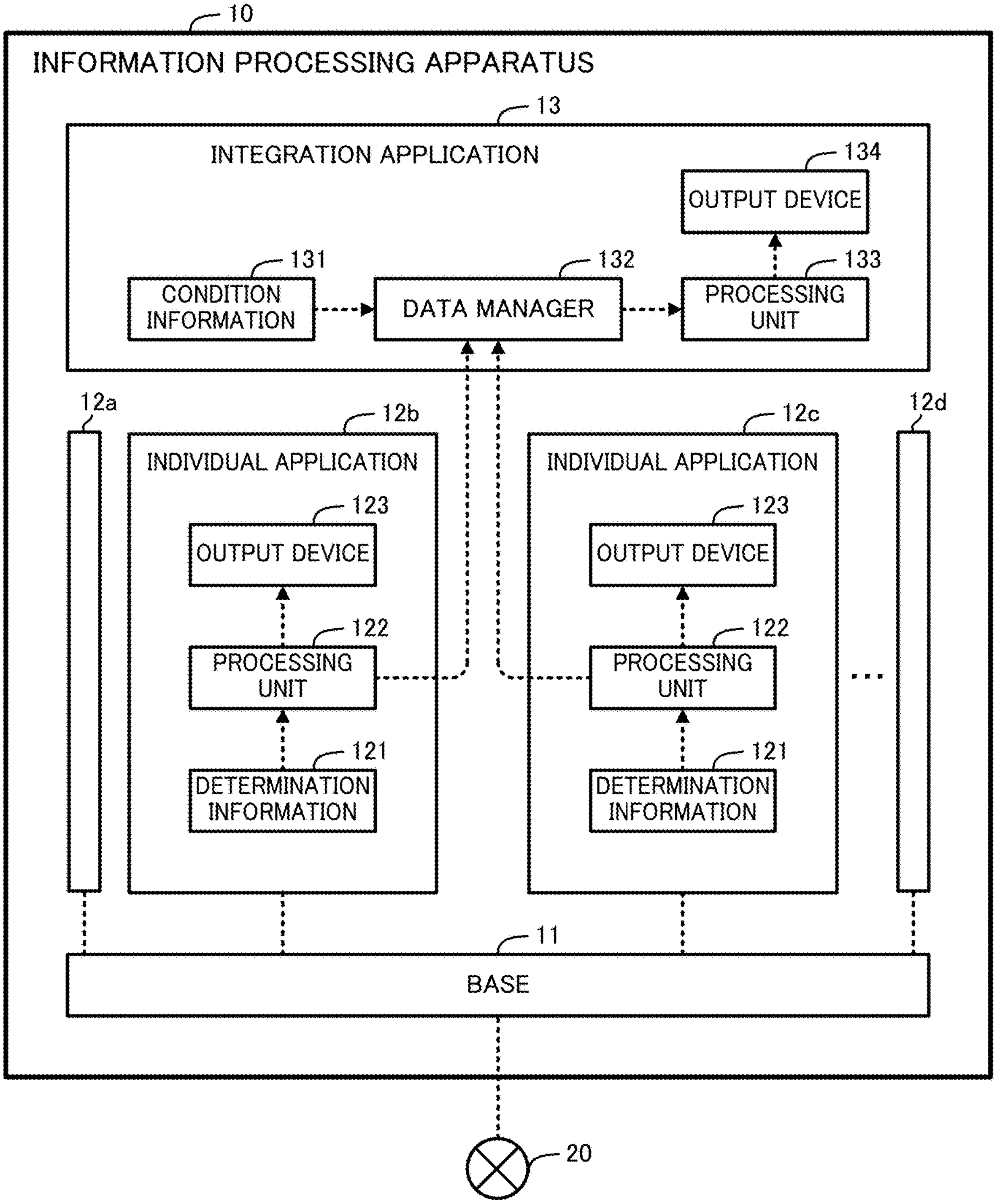
FIG. 3 is a functional block diagram of the information processing apparatus according to Embodiment 1.

With cooperation of the above hardware components, the information processing apparatus 10 performs various functions. More specifically, as illustrated in FIG. 3, the information processing apparatus 10 includes, as functional components, a base 11 corresponding to middleware that performs basic functions such as a communication function, individual applications 12*a*, 12*b*, 12*c*, and 12*d* that each process control data using the base 11, and an integration application 13 that integrates the results of processes from two or more of the individual applications 12*a*, 12*b*, 12*c*, and 12*d*. Each of the individual applications 12*a*, 12*b*, 12*c*, and 12*d* may be hereafter referred to as an individual application 12 without distinguishing one from another.

The base 11 is mainly implemented by the processor 101 that executes the program P1 and the communicator 106 in cooperation. The base 11 includes a web server and a database server and provides, using an API function, a function to communicate through the network 20 to the individual applications 12. More specifically, the base 11 acquires control data from a partner device specified by an individual application 12 and provides the acquired control data to the individual application 12 requesting the data. The base 11 corresponds to an example of providing means for receiving data about control of the machine through the network and providing the data.

Each individual application 12 is mainly implemented by the processor 101 that executes the program P2 being application software. Each program P2 is created by the user and individually installed on the information processing apparatus 10 by the user or the customer. Each individual application 12 individually performs a predetermined process on data and provides functions usable by the customer. The main functions of the individual applications 12 are implemented based on the control data acquired from the base 11. For example, each individual application 12 is an engineering application, a digital twin application, a dedicated application for a specific type of machines 31 or the controller 32, a general-purpose application, or another application for processing the control data.

Each individual application 12 includes determination information 121 for determining whether the condition for cooperating with the integration application 13 are satisfied, a processing unit 122 that processes the control data, and an output device 123 that outputs the processing result of the control data to the terminal 35 through the network 20.

The determination information 121 is indicated by the program P2. The program P2 preliminarily including the determination information 121 may be installed on the information processing apparatus 10, or the determination information 121 may be read from a predetermined address or an address specified by the user or the customer after the program P2 is executed and then may be added to the individual application 12. This address may be an address on a network or an address indicating an area of a storage device. The details of the determination information 121 are described later.

The processing unit 122 performs a predetermined process on the control data and outputs the results of the process to the output device 123. The control data to be processed by the processing unit 122 and the details of the process differ among the individual applications 12. For example, the individual application 12*a* acquires, as a device value of the controller 32, data indicating the sensing results from the machine 31 being a sensor through the base 11 and performs the process of detecting abnormal values in the sensing results or the process of generating a record of the detection count per unit time based on detection of workpieces indicated by the sensing results. The individual application 12*b* directly acquires the results of determining the workpiece quality from the machines 31 using the base 11 not via the controller 32 being an inspector in the controller 32, and calculates the yield.

The output device 123 outputs, in response to a request from the terminal 35, information indicating the results of the process from the processing unit 122 to the network 20 through the base 11 with the terminal 35 as the destination. Each individual application 12 corresponds to an example of individual processing means, first individual processing means, or second individual processing means for outputting, to the network, results acquired by performing different processes on data provided by the providing means.

The integration application 13 is mainly implemented by the processor 101 that executes the program P3 being application software. The program P3 is created by the user and installed on the information processing apparatus 10 by the user or the customer. The integration application 13 performs predetermined data processing and provides functions usable by the customer. Substantial functions of the integration application 13 are implemented based on the results of the processes performed by the individual applications 12. The integration application 13 is thus an upper application located on an upper level than the multiple individual applications 12.

The integration application 13 includes condition information 131 indicating the conditions for cooperating with an individual application 12, a data manager 132 that selects the individual application 12 with which the integration application 13 cooperates and acquires the results of the process from the selected individual application 12, a processing unit 133 that performs integration processing for integrating the results of the processes performed by the individual applications 12, and an output device 134 that outputs the processing results from the processing unit 133 to the terminal 35 through the network 20.

The condition information 131 is indicated by the program P3. Similarly to the determination information 121, the program P3 preliminarily including the condition information 131 may be installed on the information processing apparatus 10, or the condition information 131 may be read from a predetermined address or an address specified by the user or the customer after the program P3 is executed and then may be added to the integration application 13.

Figure 4:
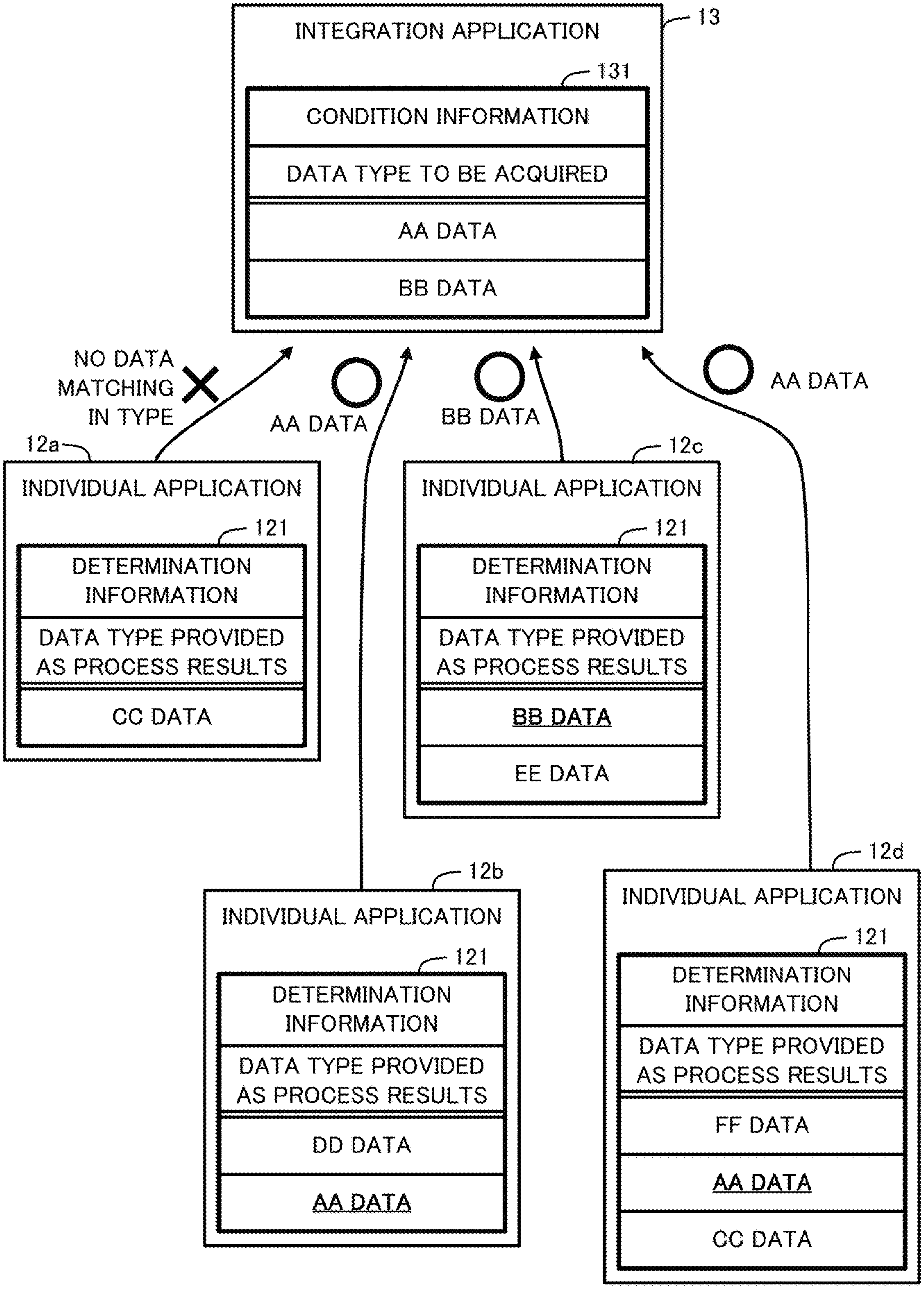
FIG. 4 is a diagram describing condition information and determination information in Embodiment 1.

The details of the condition information 131 and the determination information 121 are described. As illustrated in FIG. 4, the condition information 131 and the determination information 121 indicate the types of data. More specifically, the condition information 131 indicates the types of data to be acquired by the integration application 13 for performing the integration processing, and the determination information 121 indicates one or more types of data provided as the results of the process from the individual application 12.

In the example in FIG. 4, the condition information 131 indicates AA data and BB data. The determination information 121 in the individual application 12*a* indicates CC data, the determination information 121 in the individual application 12*b* indicates DD data and AA data, the determination information 121 in the individual application 12*c* indicates BB data and EE data, and the determination information 121 in the individual application 12*d* indicates FF data, AA data, and CC data. In this example, the determination information 121 in each of the individual applications 12*b*, 12*c*, and 12*d* indicates the data types matching the data types indicated by the condition information 131. The individual applications 12*b*, 12*c*, and 12*d* thus satisfy the condition for transmitting data to the integration application 13.

The determination information 121 in the individual application 12*a* does not indicate the data type matching the data type indicated by the condition information 131. The individual application 12*a* thus does not satisfy the condition for transmitting data to the integration application 13.

The data types may be of any format. For example, a single data type may be a result of a process on control data derived from a specific type of the machines 31 or the controller 32, a specific device value of the controller 32 that is a PLC, or a result acquired by performing a specific process performed on any control data.

Referring back to FIG. 3, the data manager 132 inquires of each individual application 12 as to whether the individual application 12 can provide any data type indicated by the condition information 131 to determine whether the individual application 12 satisfies the condition, and selects the individual application 12 including the determination information 121 satisfying the condition. More specifically, the data manager 132 selects the individual application 12 including the determination information 121 indicating the data type matching any of the data types indicated by the condition information 131. The data manager 132 outputs data acquired from the selected individual application 12 to the processing unit 133.

The data manager 132 performs monitoring to determine an individual application 12 from which data is to be acquired and a device in the facility 300 from which the control data is to be acquired and performs control accordingly. In other words, the data manager 132 manages a channel of information including first transmission of the control data from a device corresponding to the data source in the facility 300 to the individual application 12 and second transmission of data from the individual application 12 to the integration application 13. The device in the facility 300 may be any of the machines 31 or the controller 32, or another device. The data manager 132 corresponds to an example of management means for managing the channel of information transmission including first transmission of data about control of the machine from the device corresponding to the data source in the facility to the individual processing means and second transmission of the results of the processes from the individual processing means to the integration means.

More specifically, the data manager 132 includes, as illustrated in FIG. 5, management information indicating the transmission channel of data acquired by the integration application 13 from inside the facility 300. For example, the first record in FIG. 5 indicates that the control data is transmitted from a device D1 in the facility to the individual application 12*b*, and AA data is transmitted from the individual application 12*b* to the integration application 13. In the management information in FIG. 5, the identifiers of the integration application 13, the individual application 12, and the device are in the square brackets, and the identifiers of the integration application 13 and the individual application 12 are the same as the reference signs in FIG. 3.

The data manager 132 inquires of the individual application 12 selected in the above manner as to a device corresponding to the data source of the control data in the facility 300 and a device through which the control data is transmitted, and generates management information. The data manager 132 repeatedly acquires system configuration information indicating the configuration of the control system in the facility 300 and updates the management information. The control system includes the machines 31, the controller 32, and the device corresponding to the data source. The data manager 132 may acquire the system configuration information by inquiring of the individual application 12, inquiring of the device in the facility 300 through the base 11 and without using the individual application 12, inquiring through a connector (not illustrated) without using the base 11, or any combination of these. For example, when the device from which the individual application 12*b* acquires the control data is changed from a device D1 to a device D99, the data manager 132 reflects the change on the management information in FIG. 5. The data manager 132 corresponds to an example of management means for repeatedly acquiring the system configuration information indicating the configuration of a system including the machines and the devices in the facility and managing the channel of information transmission based on the acquired system configuration information.

The data manager 132 monitors the individual applications 12 installed on the information processing apparatus 10. When a new individual application 12 is added, the data manager 132 determines whether the new individual application 12 satisfies the condition. When the new individual application 12 satisfies the condition, the data manager 132 determines the new individual application 12 to be a source from which the results of a process are to be acquired similarly to the individual applications 12 selected previously, and adds the new individual application 12 to the management information. The data manager 132 corresponds to an example of management means for performing monitoring to determine whether the individual processing means included in the information processing apparatus 10 include new individual processing means, and determining whether the results of the process performed by the new individual processing means are to be acquired from the new individual processing means.

The data manager 132 may also change the management information as instructed by the user or the customer and control the information transmission channel based on the changed management information. For example, as illustrated in FIG. 5, when the multiple individual applications 12 provide the same type of AA data, the data manager 132 may acquire the AA data from simply one of the individual applications 12 without acquiring the AA data from the others, or may also acquire the AA data from the other individual applications 12 and discard the data. The device corresponding to the data source of the control data may also be changed based on the change of the management information.

Referring back to FIG. 3, the processing unit 133 performs predetermined integration processing on the results of the processes acquired from the individual applications 12 and outputs the results of the integration processing to the output device 134. The integration processing may be, for example, the processing of calculating the operation rate of the entire production line including the multiple machines 31 based on the results of the processes performed individually on the machines 31 by the individual applications 12, the processing of combining the states of the individual machines 31 to detect an indication of the production line being stopped, or other processing.

The output device 134 outputs, in response to the request from the terminal 35, the integration information indicating the results of the integration processing performed by the processing unit 133 to the network 20 through the base 11 with the terminal 35 as the destination. The integration application 13 corresponds to an example of integration means for selecting two or more individual processing means of the multiple individual processing means in accordance with predetermined conditions, and outputting, to the network, integration information acquired by integrating the results of the processes performed by the selected two or more individual processing means.

Figure 6:
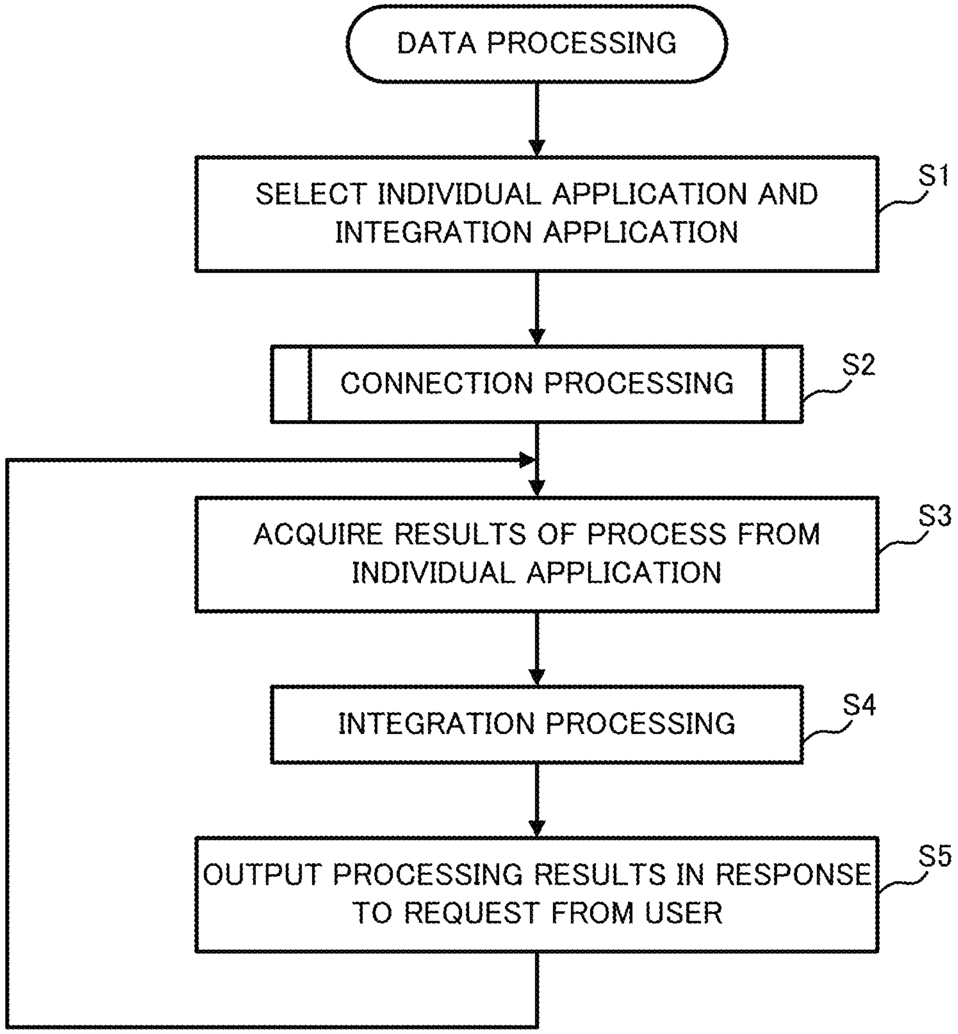
FIG. 6 is a flowchart of data processing in Embodiment 1.

Example of data processing performed by the information processing apparatus 10 is described with reference to FIGS. 6 and 7. The data processing illustrated in FIG. 6 corresponds to an example of a data processing method including a series of procedures for operating the individual application 12 and the integration application 13 in cooperation. The data processing illustrated in FIG. 6 is merely an example, and the order of the procedures may be changed as appropriate.

In the data processing, the user or the customer selects the individual application 12 and the integration application 13 to be implemented on the information processing apparatus

10 (step S1). More specifically, one of the preregistered programs P2 and P3 selected by the user or the customer is installed on the information processing apparatus 10 to implement the selected individual application 12 and the integration application 13. The connection processing for connecting one of the multiple individual applications 12 that satisfies the predetermined condition and the integration application 13 is then performed (step S2). This causes the integration application 13 to be ready, causing the information processing apparatus 10 to be usable by the customer. The details of the connection processing are described later.

The integration application 13 then acquires the results of the process from the individual application 12 connected in step S2 (step S3), performs the integration processing on the acquired results of the process (step S4), and outputs the results of the integration processing in step S4 to the terminal 35 in response to the request from the customer (step S5). The information processing apparatus 10 then repeats the processing from step S3. The results of the process in step S3 are provided to the terminal 35 by the individual application 12 in response to the request from the customer.

Figure 7:
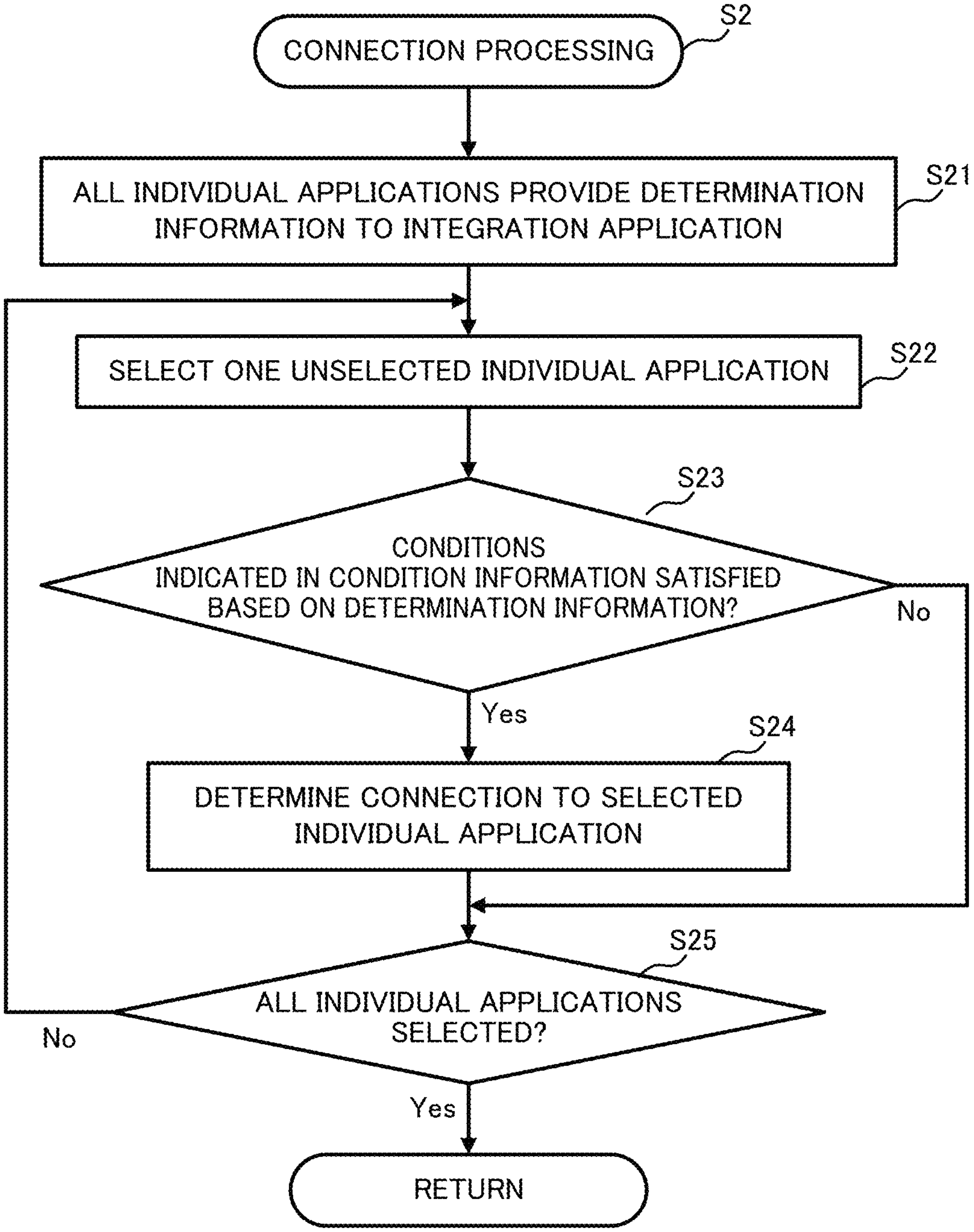
FIG. 7 is a flowchart of connection processing in Embodiment 1.

FIG. 7 illustrates the details of the connection processing in step S2. In the connection processing, all the individual applications 12 provide the determination information 121 to the integration application 13 (step S21). The individual applications 12 may provide the determination information 121 in response to the request from the integration application 13 or may automatically provide the determination information 121 independently of a request.

The integration application 13 then temporarily selects one of the individual applications 12 unselected in the connection processing (step S22). For example, the data manager 132 in the integration application 13 selects the individual application 12*a* illustrated in FIG. 3. The individual applications 12 may be selected in any order and may thus be selected in ascending or descending order of the identifiers of the individual applications 12 that distinguish the individual applications 12 from one another, or in order in which the determination information 121 is provided. Each identifier is, for example, a process identification (ID) assigned by an operating system (OS), the name of the individual application 12, the program P2 that implements the individual application 12, or the hash value of the program P2.

The integration application 13 then determines, based on the determination information 121 of the individual application 12 selected in step S22, whether the condition indicated by the condition information 131 is satisfied(step S23). For example, as illustrated in FIG. 4, when the condition information 131 and the determination information 121 indicate the data types, the data manager 132 in the integration application 13 compares the determination information 121 and the condition information 131 to determine whether both the determination information 121 and the condition information 131 indicate the same data type. When the individual application 12*a* is selected in step S22, the determination information 121 and the condition information 131 do not indicate the same data type as illustrated in FIG. 4, and the determination result in step S23 is negative.

When the condition is determined to be unsatisfied (No in step S23), the integration application 13 determines whether all the individual applications 12 have been selected (step S25). When determining that not all the individual applications 12 have been selected (No in step S25), the integration application 13 repeats the processing in step S22 and subsequent steps. Thus, for example, the individual application 12*b* illustrated in FIG. 3 is selected, and steps S22 to S25 are repeated.

When the individual application 12*b* is selected, both the determination information 121 and the condition information 131 indicate the AA data as illustrated in FIG. 4. The integration application 13 thus determines that the condition is satisfied.

When determining that the condition is satisfied (Yes in step S23), the integration application 13 determines connection to the individual application 12 selected in step S22 (step S24). Thus, the results of the process performed by the individual application 12 determined to be connected are transmitted to the integration application 13, and the integration application 13 performs the integration processing using the transmitted results of the process. The integration application 13 then advances the processing to step S25. The data type providable by the individual application 12 but unsatisfying the condition, such as the DD data of the individual application 12*b* illustrated in FIG. 4, is not provided to the integration application 13.

In step S25, when the integration application 13 determines that all the individual applications 12 have been selected (Yes in step S25), the information processing apparatus 10 returns from the connection processing illustrated in FIG. 7 to the data processing illustrated in FIG. 6.

As described above, the integration application 13 in the present embodiment outputs, to the network 20, the integration information acquired by integrating the results of the processes performed by the selected individual applications 12. The user is likely to develop both an application to implement the integration application 13 and an application to implement the individual application 12. Thus, the integration application 13 can be developed independently of the API of the cloud infrastructure. The integration application 13 reuses the results of the processes performed by the individual applications 12, reducing resources used for developing the individual applications 12 and the integration application 13. The workload of developing an application executable in a cloud environment for use at an FA site can thus be reduced.

The integration application 13 as an upper application than the individual applications 12 being independent of the base 11 builds an application hierarchy including the integration application 13, the individual application 12, and the base 11 in this order.

Each individual application 12 can be implemented by application software indicating the determination information 121 for determining whether the condition for selecting the individual application 12 is satisfied. The integration application 13 is implemented by application software indicating the condition information 131 and selects the individual application 12 indicating the determination information 121 that satisfies the condition. Thus, simply installing the integration application 13 allows hierarchical selection of the individual applications 12 to be used, thus building an application system appropriate in the cloud environment. The integration application 13 functions as a package application packaging the individual applications 12.

The condition information 131 and the determination information 121 indicate the data types. The integration application 13 selects the individual application 12 including the determination information 121 indicating the data type matching the data type indicated by the condition information 131. This eliminates the development of individual applications 12 reflecting the integration processing performed by the integration application 13 and the development of an integration application 13 reflecting the processes performed by the individual applications 12. The individual application 12 and the integration application 13 can be developed individually using the same data types. The workload of developing an application can thus be reduced further.

The integration application 13 includes the data manager 132 that manages the information transmission channel. Thus, for example, the integration application 13 can select any one of the multiple individual applications 12 providing the same type of the processing results as a connection target and reduce a processing load of the integration processing.

The data manager 132 repeatedly acquires the system configuration information indicating the configuration of the control system to manage the transmission channel based on the acquired system configuration information. Thus, when the configuration of the control system is changed during the operation of the information processing apparatus 10, the integration application 13 can perform the integration processing based on the latest configuration of the control system.

The data manager 132 performs monitoring to determine whether the individual applications 12 included in the information processing apparatus 10 include a new individual application 12, and determines whether the results of the process performed by the new individual processing application 12 are to be acquired from the new individual application 12. Thus, the user or the customer simply installs the new individual application 12 for the integration application 13 to perform the integration processing using the new individual application 12.

Embodiment 2

Embodiment 2 is described focusing on the differences from Embodiment 1. Like reference signs denote the same or like components in Embodiment 1. The present embodiment differs from Embodiment 1 in that the condition information 131 in the integration application 13 indicates the identifier of the individual application 12 allowed to be connected, and the determination information 121 in the individual application 12 indicates the identifier of the integration application 13 allowed to be connected. The present embodiment also differs from Embodiment 1 in that the information processing apparatus 10 includes multiple integration applications 13.

Figure 8:
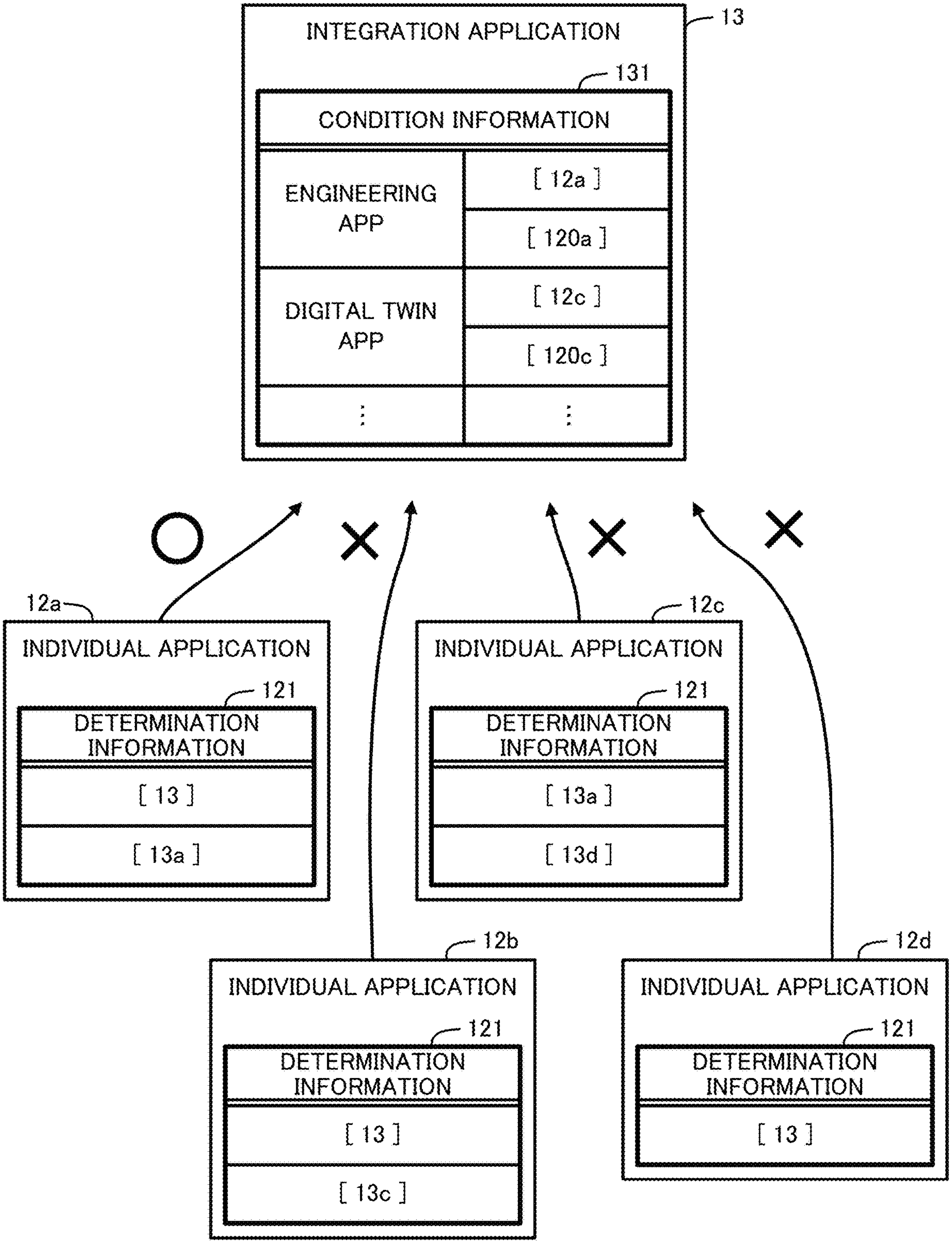
FIG. 8 is a diagram describing condition information and determination information in Embodiment 2.

FIG. 8 schematically illustrates an example of the condition information 131 and examples of the determination information 121 in the present embodiment. The condition information 131 includes a list of identifiers of the individual applications 12 allowed to be connected for each application classification group. In the example in FIG. 8, the classification group of an engineering app is associated with a list of identifiers 12*a* and 120*a*. Each pieces of determination information 121 includes a list of identifiers of the integration applications 13 allowed to be connected.

An integration application 13 and an individual application 12 in combination are connectable to each other when the condition information 131 in the integration application 13 indicates the identifier of the individual application 12 and the determination information 121 in the individual application 12 indicates the identifier of the integration application 13. The results of the process performed by the individual application 12 are then transmitted to the integration application 13. Other combinations are not allowed to be connected, and the results of the process are not transmitted. However, an integration application 13 and an individual application 12 in combination may be connectable to each other when the user or the customer allows the connection upon the data manager 132 in the integration application 13 inquiring whether the connection is allowed.

The connection processing in the present embodiment is described with reference to FIGS. 9 and 10. The connection processing in the present embodiment includes first connection processing included in an initialization sequence of the integration application 13 added to the information processing apparatus 10 and second connection processing included in an initialization sequence of the individual application 12 added to the information processing apparatus 10.

Figure 9:
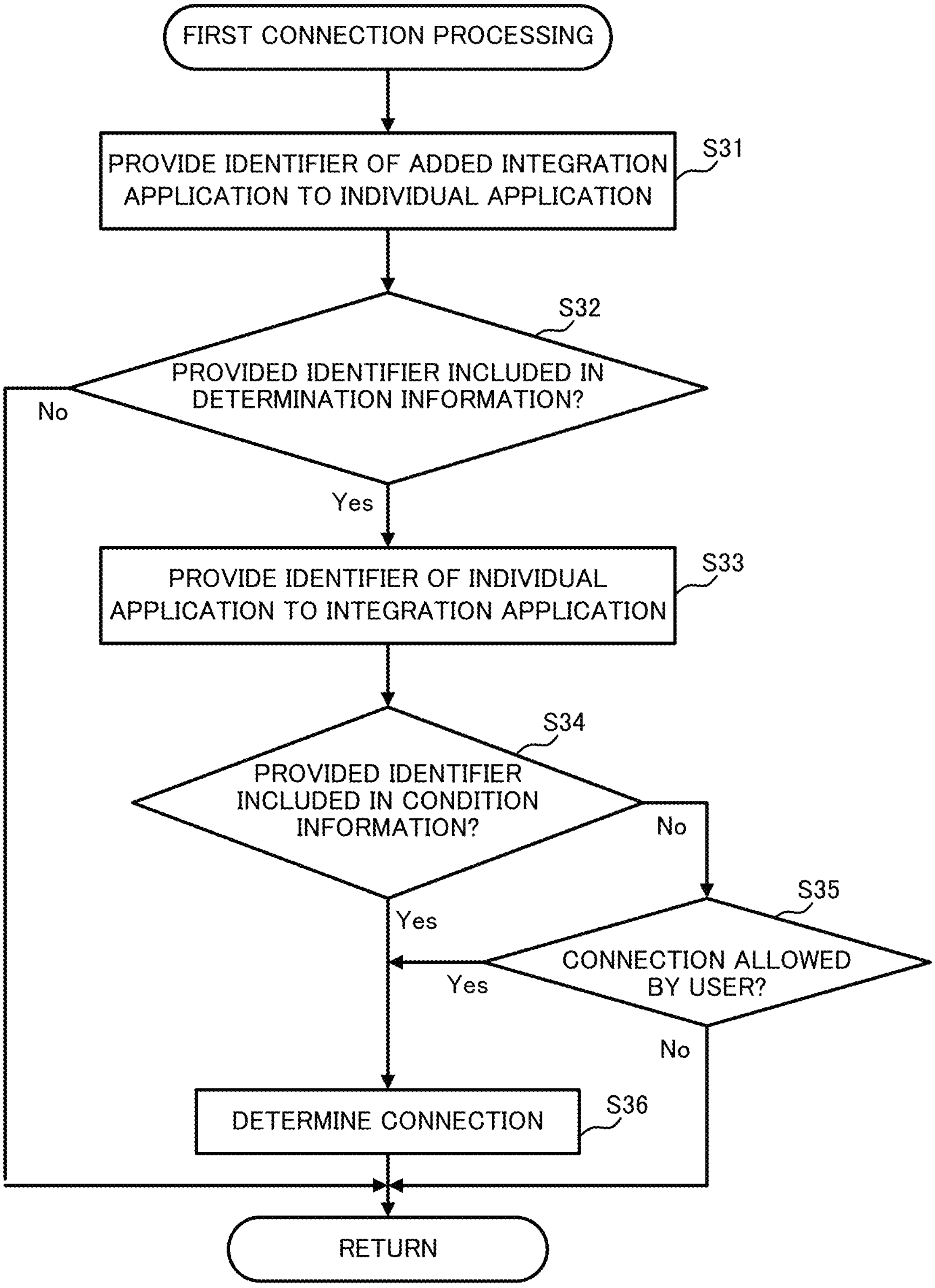
FIG. 9 is a flowchart of first connection processing in Embodiment 2.

The first connection processing illustrated in FIG. 9 is performed on each combination of the added integration application 13 and each existing individual application 12. In the first connection processing, the added integration application 13 provides the identifier of the added integration application 13 to the individual application 12 (step S31).

The individual application 12 then determines whether the determination information 121 includes the identifier provided in step S31 (step S32). When the determination information 121 is determined not to include the identifier (No in step S32), the first connection processing ends, and the information processing apparatus 10 returns to the data processing.

When the determination information 121 is determined to include the identifier (Yes in step S32), the individual application 12 provides the identifier of the individual application 12 to the added integration application 13 (step S33).

The integration application 13 then determines whether the condition information 131 includes the identifier provided in step S33 (step S34). When the condition information 131 is determined to include the identifier (Yes in step S34), the integration application 13 advances the processing to step S36.

When the condition information 131 is determined not to include the identifier (No in step S34), the integration application 13 determines whether the user or the customer allows connection to the individual application 12 (step S35). More specifically, the integration application 13 inquires of the user or the customer as to whether to allow the connection and acquires an input from the user or the customer.

When the user or the customer is determined not to allow the connection (No in step S35), the first connection processing ends. When the user or the customer is determined to allow the connection (Yes in step S35), the integration application 13 determines the connection to the individual application 12 (step S36). More specifically, the integration application 13 determines to receive the results of the processes from the individual applications 12 to perform the integration processing. The first connection processing then ends.

Figure 10:
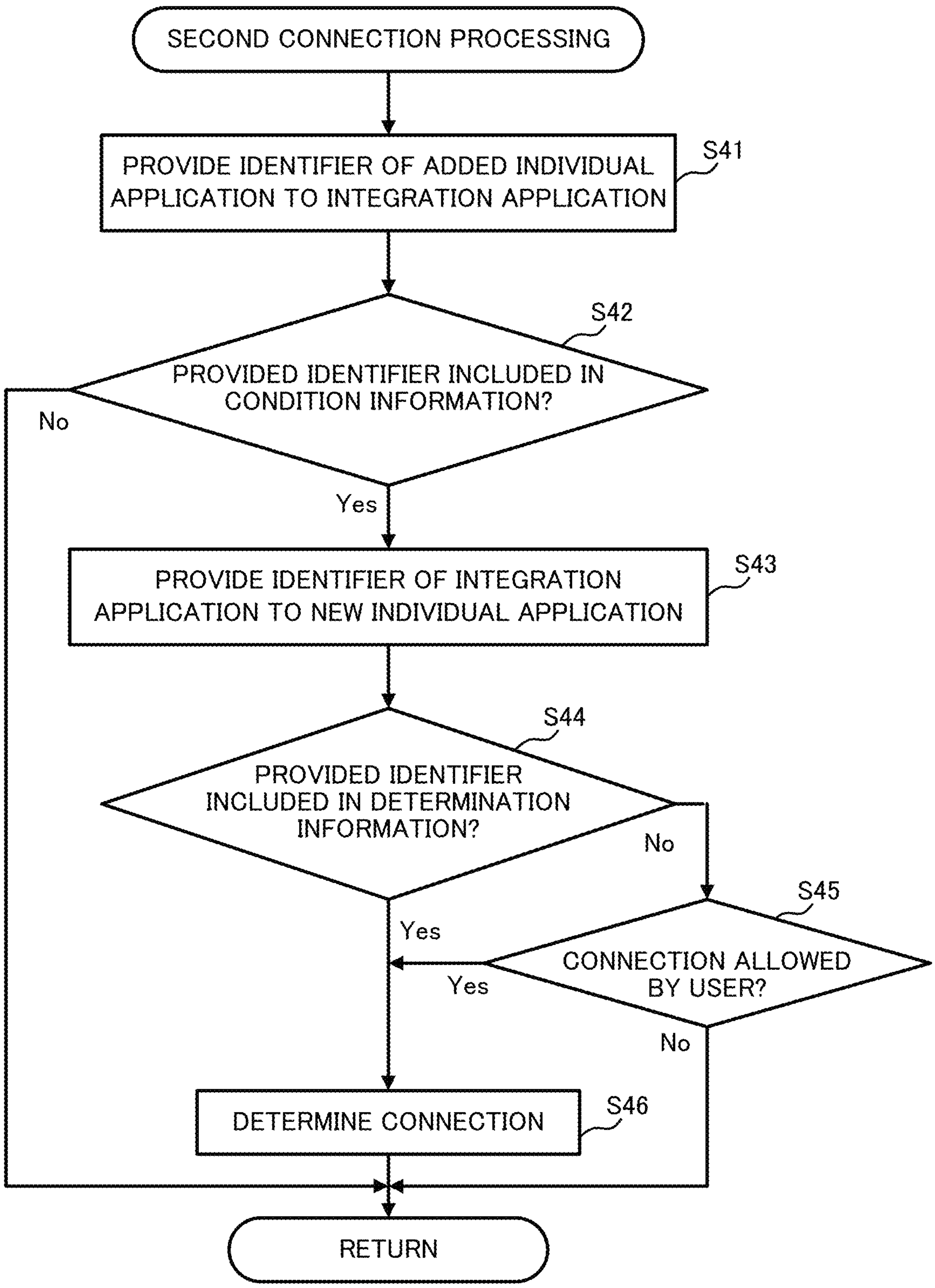
FIG. 10 is a flowchart of second connection processing in Embodiment 2.

As illustrated in FIG. 10, the second connection processing triggered by an individual application 12 being added corresponds to the first connection processing, with the integration application 13 replaced by the individual application 12 and the condition information 131 replaced by the determination information 121. More specifically, the second connection processing is performed on each combination of the added individual application 12 and each existing integration application 13. In the second connection processing, the added individual application 12 provides the identifier of the added individual application 12 to the integration application 13 (step S41).

The integration application 13 then determines whether the condition information 131 includes the identifier provided in step S41 (step S42). When the condition information 131 is determined not to include the identifier (No in step S42), the second connection processing ends, and the information processing apparatus 10 returns to data processing.

When the condition information 131 is determined to include the identifier (Yes in step S42), the integration application 13 provides the identifier of the integration application 13 to the added individual application 12 (step S43).

The individual application 12 then determines whether the determination information 121 includes the identifier provided in step S43 (step S44). When the determination information 121 is determined to include the identifier (Yes in step S44), the individual application 12 advances the processing to step S46.

When the determination information 121 is determined not to include the identifier (No in step S44), the individual application 12 determines whether the user or the customer allows connection to the integration application 13 (step S45).

When the user or the customer is determined not to allow the connection (No in step S45), the second connection processing ends. When the user or the customer is determined to allow the connection (Yes in step S45), the individual application 12 determines the connection to the integration application 13 (step S46). More specifically, the individual application 12 determines to transmit the results of the process for performing the integration processing to the integration application 13. The second connection processing then ends.

As described above, the embodiment in which the condition information 131 and the determination information 121 indicate the application identifiers produces the same effects as in Embodiment 1.

The first connection processing and the second connection processing are also performed, in addition to when the information processing apparatus 10 is activated, when a new integration application 13 or a new individual application 12 is added during the operation of the information processing apparatus 10.

In the example described above, the user or the customer allows connection. Here, the user is a developer of the application, and the customer is a target who receives the functions of the application from the user.

Although one or more embodiments of the present disclosure have been described above, the present disclosure is not limited to the above embodiments.

For example, the example mainly described in Embodiment 1 includes one integration application 13. In some embodiments, multiple integration applications 13 may be included.

The condition information 131 and the determination information 121 are each in a list format as illustrated in Embodiments 1 and 2. However, the condition information 131 and the determination information 121 may be any information that determines connection between an integration application 13 and an individual application 12. For example, the condition information 131 may indicate an application certificate of the integration application 13, and the individual application 12 may provide the results of the process upon confirming the validity of the certificate. The determination information 121 may indicate an application certificate of the individual application 12, and the integration application 13 may acquire the results of the process upon confirming the validity of the certificate. In this example, both certificates being valid satisfy the condition.

In the examples described above, all the integration applications 13 and the individual applications 12 are implemented by application software, but a part of the integration applications 13 and the individual applications 12 may be implemented by dedicated hardware. For example, the process performed by the individual application 12 may be performed by arithmetic processing using a graphic processing unit (GPU).

In the examples described above, the information processing apparatus 10 is a single computer device. In some embodiments, the information processing apparatus 10 may include multiple computer devices.

The integration processing performed by the integration application 13 may or may not involve data processing. The integration processing not involving data processing may, for example, list the results of processes performed by the multiple individual applications 12 to increase viewability for the customers.

In the example mainly described above, the information processing apparatus 10 corresponds to a cloud server. In some embodiments, the information processing apparatus 10 may be a server device that provides a cloud service or a network service. For example, in an embodiment in which a cloud service is provided from a central server through a local server, the central server or the local server may perform the functions of the information processing apparatus 10.

In the above embodiments, the programs P2 and P3 are preregistered with the information processing apparatus 10, and the user or the customer selects the individual applications 12 and the integration applications 13 to be available. With the programs P2 and P3 preregistered with the information processing apparatus 10, the cooperation between the individual applications 12 and the integration applications 13 may be prepared in advance. For example, after the connection processing in FIG. 6 is performed on any combination of the individual application 12 and the integration application 13 included in the information processing apparatus 10, the customer may select the individual application 12 and the integration application 13 to be used. As described in the above embodiments, the customer may install the programs P2 and P3 on the information processing apparatus 10. The customer may prepare an existing customer's operation system and implement the information processing apparatus 10 by shift to the cloud environment to include such an existing system.

The functions of the information processing apparatus 10 according to the above embodiments can be implemented by dedicated hardware or a general-purpose computer system.

For example, the programs P1, P2, and P3 may be stored in a non-transitory computer-readable recording medium such as a flexible disc, a compact disc read-only memory (CD-ROM), a digital versatile disc (DVD), or a magneto-optical (MO) disk, for distribution. The program P1 may be installed on a computer to provide a device that performs the above processing.

The programs P1, P2, and P3 may be stored in a disk device included in a server on a communication network, such as the Internet, and may be, for example, superimposed on a carrier wave to be downloaded to a computer.

The above processing may also be performed by the programs P1, P2, and P3 activated and executed while being transferred through a network, such as the Internet.

The above processing may be performed by entirely or partially executing the programs P1, P2, and P3 on a server while a computer is transmitting and receiving information about the processing through a communication network.

In the system with the above functions implementable partially by the OS or through cooperation between the OS and applications, portions executable by applications other than the OS may be stored in a non-transitory recording medium that may be distributed or may be downloaded to a computer.

Means for implementing the functions of the information processing apparatus 10 is not limited to software, and may be partially or entirely implemented by dedicated hardware or a dedicated circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

One or more embodiments of the present disclosure are applicable to the development of an application executable in a cloud environment.

REFERENCE SIGNS LIST

10 Information processing apparatus
101 Processor
102 Main storage
103 Auxiliary storage
104 Input device
105 Output device
106 Communicator
107 Internal bus
11 Base
12, **12*a*, 12*b*, 12*c*, 12*d*** Individual application
121 Determination information
122 Processing unit
123 Output device
13 Integration application
131 Condition information
132 Data manager
133 Processing unit
134 Output device
20 Network
31 Machine
32 Controller
33 Industrial network
34 Communication device
35 Terminal
300 Facility
P1 to P3 Program

The invention claimed is:

1. An information processing apparatus connectable through a network to a facility in which a machine is controlled, the information processing apparatus comprising:

a provider to receive data about control of the machine through the network and provide the data; and processing circuitry to execute a plurality of individual processing applications to output, to the network, results acquired by performing different processes on the data provided by the provider; and an integration application to select two or more individual processing applications of the plurality of individual processing applications in accordance with a predetermined condition, and output, to the network, integration information acquired by integrating results of processes performed by the selected two or more individual processing applications, wherein the plurality of individual processing applications is implemented by application software indicating determination information for determining whether the predetermined condition is satisfied, and the integration application is implemented by application software indicating condition information indicating the predetermined condition and selects at least one of the plurality of individual processing applications corresponding to the determination information satisfying the predetermined condition.

2. The information processing apparatus according to claim 1, wherein the condition information indicates a type of data to be acquired by the integration application as the predetermined condition, the determination information indicates a type of data provided by each of the plurality of individual processing applications as a result of the process performed by the individual processing application, and the integration application selects at least one of the plurality of individual processing applications corresponding to the determination information indicating a type of data matching the type of data indicated by the condition information.

3. An information processing apparatus connectable through a network to a facility in which a machine is controlled, the information processing apparatus comprising:

a provider to receive data about control of the machine through the network and provide the data; and processing circuitry to execute a plurality of individual processing applications to output, to the network, results acquired by performing different processes on the data provided by the provider; and an integration application to select two or more individual processing applications the plurality of individual processing applications in accordance with a predetermined condition, and output, to the network, integration information acquired by integrating results of processes performed by the selected two or more individual processing applications, wherein the integration application manages a channel of information transmission including first transmission of data about control of the machine from a device corresponding to a data source in the facility to each of the plurality of individual processing applications and second transmission of the results of the different processes from the plurality of individual processing applications to the integration application.

4. The information processing apparatus according to claim 3, wherein the integration application repeatedly acquires system configuration information indicating a configuration of a system including the machine and the device in the facility and manages the channel of information transmission based on the acquired system configuration information.

5. The information processing apparatus according to claim 4, wherein the integration application performs monitoring to determine whether the plurality of individual processing applications included in the information processing apparatus include new individual processing application, and determines whether a result of the process performed by the new individual processing application is to be acquired from the new individual processing application.

6. The information processing apparatus according to claim 3, wherein the integration application performs monitoring to determine whether the plurality of individual processing applications included in the information processing apparatus include new individual processing application, and determines whether a result of the process performed by the new individual processing application is to be acquired from the new individual processing application.

7. A non-transitory computer-readable recording medium storing a program, the program causing a computer connectable through a network to a facility in which a machine is controlled to function as:

an integration processor to select, in accordance with a predetermined condition, two or more individual processors of a plurality of individual processors that outputs, to the network, results acquired by performing different processes on data about control of the machine, and to integrate results of processes performed by the selected two or more individual processors to acquire integration information and output the integration information to the network, wherein the plurality of individual processors is implemented by application software indicating determination information for determining whether the predetermined condition is satisfied, and the integration processor is implemented by application software indicating condition information indicating the predetermined condition and selects at least one of the plurality of individual processors corresponding to the determination information satisfying the predetermined condition.

8. A non-transitory computer-readable recording medium storing a program, the program causing a computer connectable through a network to a facility in which a machine is controlled to function as:

a first individual processor to output, to the network, a result acquired by performing a process on data about control of the machine received from the network and provided by a provider, wherein the first individual processor indicates determination information for determining whether a condition for an integration processor to select two or more individual processors from a plurality of individual processor is satisfied, the plurality of individual processor include the first individual processor and a second individual processor different from the first individual processor, and the first individual processor provides the result of the processor to the integration means when the condition is determined to be satisfied based on the determination information.

9. A non-transitory computer-readable recording medium storing a program, the program causing a computer connectable through a network to a facility in which a machine is controlled to function as:

an integration processor to select, in accordance with a predetermined condition, two or more individual processors of a plurality of individual processors that outputs, to the network, results acquired by performing different processes on data about control of the machine, and to integrate results of processes performed by the selected two or more individual processors to acquire integration information and output the integration information to the network, wherein the integration processor include a manager to manage a channel of information transmission including first transmission of data about control of the machine from a device corresponding to a data source in the facility to each of the plurality of individual processors and second transmission of the results of the different processes from the plurality of individual processors to the integration processor.

* * * * *